United States Patent
Rodriguez et al.

(10) Patent No.: US 12,547,928 B2
(45) Date of Patent: Feb. 10, 2026

(54) METHOD AND A SYSTEM FOR APPLYING MACHINE LEARNING TO AN APPLICATION

(71) Applicant: ABB Schweiz AG, Baden (CH)

(72) Inventors: Pablo Rodriguez, Ilvesheim (DE); Benjamin Kloepper, Mannheim (DE); Arzam Muzaffar Kotriwala, Ladenburg (DE); Marcel Dix, Mannheim (DE); Debora Clever, Zwingenberg (DE); Fan Dai, Zwingenberg (DE)

(73) Assignee: ABB Schweiz AG, Baden (CH)

( * ) Notice: Subject to any disclaimer, the term of this patent is extended or adjusted under 35 U.S.C. 154(b) by 1153 days.

(21) Appl. No.: 17/317,926

(22) Filed: May 12, 2021

(65) Prior Publication Data

US 2021/0264317 A1    Aug. 26, 2021

Related U.S. Application Data

(63) Continuation of application No. PCT/EP2018/084140, filed on Dec. 10, 2018.

(30) Foreign Application Priority Data

Nov. 13, 2018   (WO) ................. PCT/EP2018/081037

(51) Int. Cl.
*G06N 20/00* (2019.01)
*B25J 9/16* (2006.01)
*G06F 30/20* (2020.01)

(52) U.S. Cl.
CPC .............. *G06N 20/00* (2019.01); *B25J 9/163* (2013.01); *G06F 30/20* (2020.01)

(58) Field of Classification Search
CPC ........ G06N 20/00; G06N 3/008; G06N 3/126; B25J 9/163; B25J 9/1671; G06F 30/20;
(Continued)

(56) References Cited

U.S. PATENT DOCUMENTS 9,671,777 B1   6/2017 Aichele et al.
9,811,074 B1 * 11/2017 Aichele ................. B25J 9/1656
(Continued)

FOREIGN PATENT DOCUMENTS

CN     106363635 A    2/2017
CN     108475922 A    8/2018
(Continued)

OTHER PUBLICATIONS

Debora Clever et al, "COCoMoPL: A Novel Approach for Humanoid Walking Generation Combining Optimal Control, Movement Primitives and Learning and its Transfer to the Real Robot HRP-2," IEEE Robotics and Automation Letters, Apr. 2017, pp. 977-984, IEEE, USA.
(Continued)

*Primary Examiner* — KC Chen
(74) *Attorney, Agent, or Firm* — Fitch Even Tabin & Flannery LLP

(57) ABSTRACT

A method for applying machine learning to an application includes: a) generating a candidate policy by a learner; b) executing a program in at least one simulated application based on a set of candidate parameters provided based on the candidate policy and a state of the at least one simulated application, execution of the program providing interim results of tested sets of candidate parameters based on a measured performance information of the execution of the program; c) collecting a predetermined number of interim results and providing an end result based on a combination of the candidate parameters and/or the state with the measured performances information by a trainer; and d) generating a new candidate policy by the learner based on the end result.

14 Claims, 3 Drawing Sheets

(58) Field of Classification Search
CPC .......... G05B 2219/40311; G05B 2219/40499; G05B 13/0265
See application file for complete search history.

(56) References Cited

U.S. PATENT DOCUMENTS

| | | | |
|---|---|---|---|
| 10,058,995 B1 | 8/2018 | Sampedro et al. | |
| 2010/0036780 A1* | 2/2010 | Angelov | G06N 20/00 706/47 |
| 2014/0310208 A1* | 10/2014 | Fasel | G06N 20/00 706/12 |
| 2015/0306768 A1* | 10/2015 | Liang | G06F 30/20 703/2 |
| 2017/0285584 A1* | 10/2017 | Nakagawa | G05B 13/027 |
| 2018/0153437 A1* | 6/2018 | Schwartz | G16H 30/20 |

FOREIGN PATENT DOCUMENTS

| | | |
|---|---|---|
| EP | 0660210 A2 | 6/1995 |
| EP | 3343432 A1 | 7/2018 |
| WO | WO 2018071392 A1 | 4/2018 |

OTHER PUBLICATIONS

Matthieu Guilbert et al, "Optimization of Industrial Applications with Hardware in the Loop," 2006 IEEE/RSJ International Conference on Intelligent Robots and Systems, Nov. 2006, pp. 1-8, Beijing, China.

Jeremy A. Marvel et al, "Automated learning for parameter optimization of robotic assembly tasks utilizing genetic algorithms," IEEE International Conference on Robotics and Biomimetics, May 2009, pp. 179-184, IEEE, Bangkok, Thailand.

Clavera et al., "Policy Transfer via Modularity and Reward Guiding," *2017 IEEE/RSJ international Conference on Intelligent Robots and Systems (IROS)*, 1537-1544 (Sep. 24-28, 2017).

European Patent Office, Office Action in European Patent Application No. 18811862.4, 7 pp. (Nov. 27, 2023).

Han et al., "Machine Learning and Application of Inaccurate Concepts," *J. of Harbin Institute of Technology*, 38(10): 1736-1739 (Oct. 31, 2006).

* cited by examiner

METHOD AND A SYSTEM FOR APPLYING MACHINE LEARNING TO AN APPLICATION

CROSS-REFERENCE TO PRIOR APPLICATION

This application is a continuation of International Patent Application No. PCT/EP2018/084140, filed on Dec. 10, 2018, which claims priority to International Patent Application No. PCT/EP2018/081037, filed on Nov. 13, 2018. The entire disclosure of both applications is hereby incorporated by reference herein.

FIELD

The present disclosure relates to a method for applying machine learning to an application, a system for applying machine learning to an application, a set of parameters and a program element.

BACKGROUND

Tuning of parameters of an application program, particularly an industrial application program like a robot application program, is a tedious and time-consuming task and is often done during the commissioning and often delaying the start of production. The task often gets even harder, because the right selection of parameters depends on the changing state of the application (e.g. the handle material).

Machine learning can offer improvements. Whilst the amount of data required to learn a given task depends on the complexity of the task as well as that of the learning algorithm, effective generalization of machine learning typically requires a dataset with relatively large and diverse samples. In fact, to validate a model, some data needs to be reserved for testing purposes. However, in many industrial applications, it is often very difficult to obtain sufficient amount of quality data for machine learning. Learning methods need to be able to cope with this requisite.

A common approach is the so-called explorative learning. In this learning method, an algorithm searches new possibilities and alternatives to adapt to environmental change through continuous experimental activities. However, explorative learning is relatively expensive, dangerous and very often not even possible on the real hardware.

For example, machine learning has recently been applied to robot applications to learn basic motion. Thereby, the machine learning algorithms in particular modify the program executed in the robot application in order to improve the task to be solved.

Instead of applying machine learning on a real industrial application, simulations can be used instead, in order to perform machine learning. Generally, transferring the results of simulation based machine learning, so called offline machine learning, to the real application is quite hard. Often, the simulation does not fit sufficiently to reality. The level of learning, e.g. controller, motion, task, has to be well chosen to prevent that the reality gap, which is the gap between the simulation application and the real application, has severe consequences. Additionally, in most cases the time required for the learning process is often too long for practical applications. Additionally, the definition of an optimization process for the parameters with complete definition of constraints is very difficult.

SUMMARY

In an embodiment, the present invention provides a method for applying machine learning to an application, comprising: a) generating a candidate policy by a learner; b) executing a program in at least one simulated application based on a set of candidate parameters provided based on the candidate policy and a state of the at least one simulated application, execution of the program providing interim results of tested sets of candidate parameters based on a measured performance information of the execution of the program; c) collecting a predetermined number of interim results and providing an end result based on a combination of the candidate parameters and/or the state with the measured performances information by a trainer; and d) generating a new candidate policy by the learner based on the end result.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
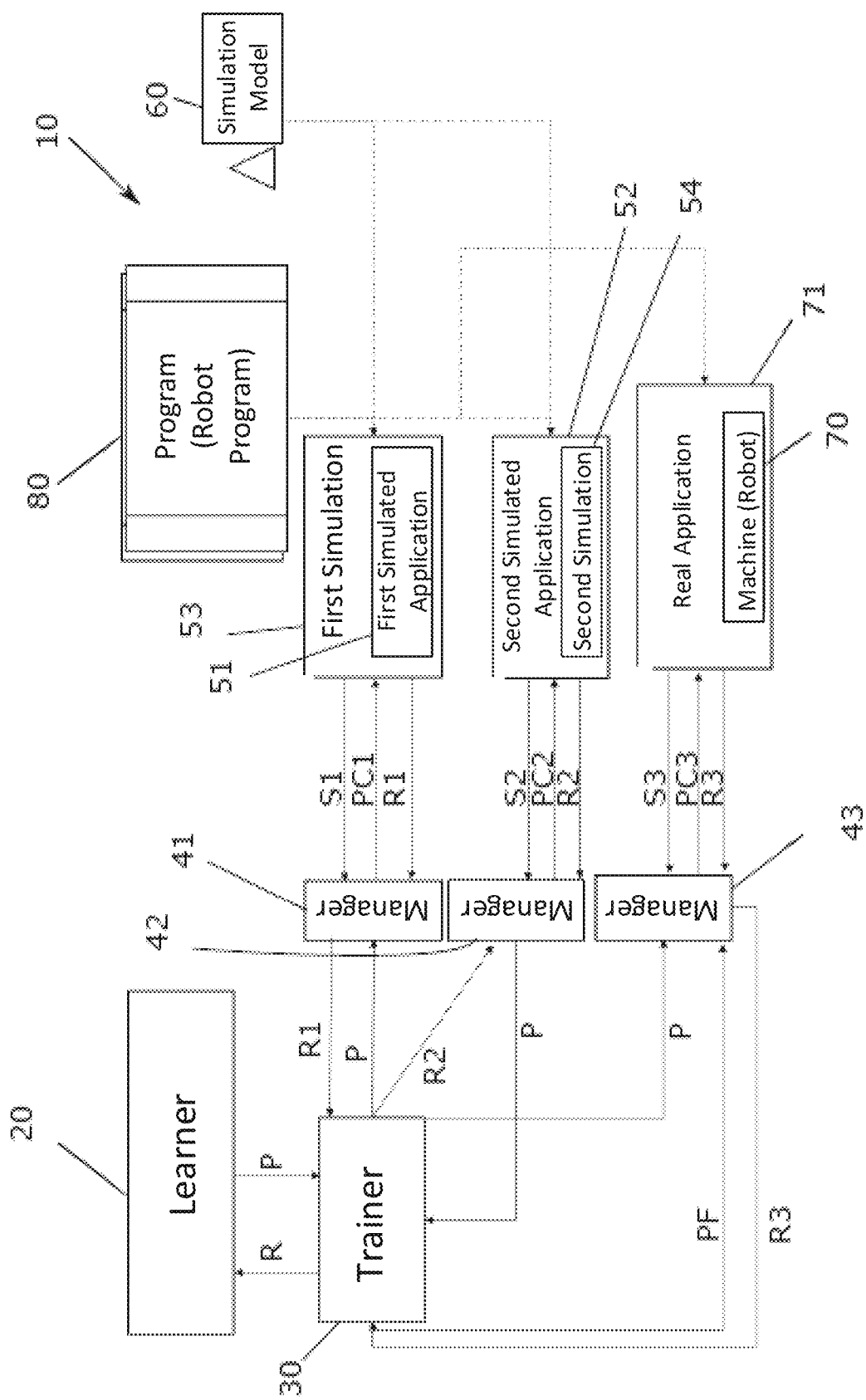
FIG. 1 shows a system for applying machine learning to an application.

In an embodiment, the present invention provides an improved method for applying machine learning to an application.

According to an aspect of the present disclosure, a method for applying machine learning, in particular state based machine learning to an application is provided, comprising the steps:

a) Generating a candidate policy by a learner;
b) Executing a program in at least one simulated application based on a set of candidate parameters provided based on the candidate policy and a state of the simulated application, the execution of the program providing interim results of tested sets of candidate parameters based on a measured performance information of the execution of the program;
c) Collecting a predetermined number of interim results and providing an end result based on a combination of the candidate parameters and/or the state with the measured performances information by a trainer; and
d) Generating a new candidate policy by the learner based on the end result.

Preferably, the simulated application starts executing the program. After some time, the simulated application needs a set of candidate parameters to further execute the program. The simulated application then requests a set of candidate parameters, in particular together with transferring the state of the state of the simulated application. Based on the state, the simulated application is provided with a set of candidate parameters mapped to the state.

The term "candidate policy" describes the mapping of states to sets of candidate parameters.

The term "state" describes a characteristic of the application, for example in case of a real robot application, in which an object should be inserted in a pocket, the state could be the information about the type of object to insert.

The simulated application preferably is a simulation of a real application. Further preferably, the simulated application is a simulation of a real industrial application, in particular a real robot application, executed on a machine, in particular a robot.

The simulated application preferably is executed on a simulation model. The simulated application preferably further comprises an application program and an application control.

For example, when the real application is a real robot application, the simulated application preferably comprises a robot application program and a robot control, including the interaction between a robot and robot environment objects.

Complementing the machine learning based on the real application by using simulated applications, in particular a set of distributed simulations, an increased amount of learning data necessary for proper machines learning can be obtained. Thus, the speed of the learning process can be increased.

For learning you need to run a large number of experiments. If you were to run it on a physical robot you need a lot of time which you don't have, and if you could run the experiments in parallel on more than one physical robots you need a lot of robots which you don't have either. Therefore, the benefit of simulation-based learning is the ability to run a large number of experiments without needing (1) neither a lot of physical robots (2) nor a lot of time.

The learner preferably is configured to generate an initial mappings application state, called policy, and sets of candidate parameters. In addition, the learner is configured to generate a new candidate policy based on the performance information of the application. The learner preferably comprises a machine learning back-end. In an advantageous embodiment, the learner uses suitable learning algorithms for generating the candidate parameters. Preferably, the learning algorithm is any kind of meta-heuristic for optimization like genetic algorithms, tabu-search or simulated annealing. Suitable algorithms for this type of learning are learning with state-tables, in particular for a small number of states, or artificial neural networks, in particular for a large number of states.

The performance information preferably comprises different elements, for example failure, success, success probability, cycle times, quality, quality metrics, etc.

The feasibility of a set of candidate parameters is not required to be defined upfront. Preferably, errors in the execution caused by an infeasible set of candidate parameters will be marked by the performance information. In case a program in a simulated application was based on an infeasible set of candidate parameters, the simulation is reset and the learning process continues with the next set of candidate parameters.

Preferably, the set of candidate parameters comprises parameters for functions of the program relating to movements and/or tasks of the machine executing the program, like for example relating to a robot picking up an object, a search radius for the object and/or a search pattern and/or an increment describing the granularity of the search.

The end result preferably is a final policy, and therefore a final set of parameters based on the state of the application, for the real application that is characterized by the most improvement of its performance regarding predetermined criteria. For example, predetermined criteria in a real robot application for searching and picking up an object would include a search time and a probability of success.

In a preferred embodiment, the program is executed in at least one simulated application and in at least one real application, particularly a real robot application, preferably executed on a machine, in particular on a robot. Preferably, the program is executed simultaneously in a plurality of simulated applications and in at least one real application.

Preferably, the real application starts executing the program. After some time, the simulated applications needs a set of candidate parameters to further execute the program. The real application then requests a set of candidate parameters, in particular together with transferring the state of the real application. Based on the state, the real application is provided with a set of candidate parameters mapped to the state.

In another preferred embodiment, the method comprises to start to learn in simulation and then to transfer the results to the real application, particularly a real robot application.

The real application is preferably executed on a machine, further preferably the real robot application is executed on a robot.

The real robot application preferably comprises a robot application with mechanical manipulator, robot control and robot application program as well as non-robot elements, like a programmable logic controller (PLC), material transportation, machining centres or the like.

Simultaneously executing a program in the simulated application and the real application decreases the so called reality gap. The simulated application almost never is an exact image of the real application. Therefore, the end results of the simulated application generally differ from end results of the real application, when the corresponding program is executed with the same set of candidate parameters. When applying machine learning only to simulated applications, there is an increased possibility that the machine learning algorithm develops in a direction, which improves the end results of the simulated application, but does not improve the end results of the real application in the same way. In this meaning, there is a gap between the simulation and reality, called reality gap. This phenomenon can lead to an end result, proposed through machine learning based on simulated applications only that in fact seems to be the best end result, however does not have to be the best end result in view of the real application.

Simultaneously, in this case has to be understood as simultaneously in view of the execution of one or more whole sets of candidate parameters. For example, it is not necessary that a program in the simulated application is executed at the exact same time as a program is executed in the real robot application.

Therefore, during the runtime of the whole learning method, there can be times, when the program is executed in the simulated application only or in the real application only. Preferably, when explorative learning is applied to the simulated application, the program is only executed in the simulated application. When explorative learning is finished, the program is also executed in the real application again. Further preferably, the program is executed in the simulated application and in the real application in parallel complementary and/or redundantly.

The same program is preferably executed in one or a plurality of simulated applications and the real application.

Preferably, the real application is additionally executed based on the set of candidate parameters and starts an additional machine learning process, further preferably with on-board algorithms, separated from the described method and thereby without a system applying the described method.

In a preferred embodiment, the program is executed in cooperating real applications, wherein the candidate policy defines task assignments to each of the cooperating real applications.

A special case of learning is learning the task assignment to several machines, in particular robots, in a cell. The candidate policy defines which sub-task an individual machine performs, for example, when relating to several robot arms, which parts it assembles according to the candidate parameter "object type" or "picking position".

In a preferred embodiment, the steps a) to d) are repeated until a stop criterion is met. Preferably, the stop criterion comprises an amount of executions of the program and/or a target measured performance information.

In a preferred embodiment, the set of candidate parameters has a parameter range, wherein the set of candidate parameters executed on the simulated application has a wider parameter range than the set of candidate parameters executed on the real application.

A wider parameter range of candidate parameters increases the risk of unsafe parametrization. For example, an unsafe parametrization could lead to damage to the real application, when the program run with the unsafe parameters instructs the real application to damage itself or the environment. In case of a real robot application, the robot may collide with surrounding objects, when it is run with unsafe parameters. Therefore, those scenarios are preferably tested in the simulated application. Based on a set of candidate parameters with wide parameter range, a subset of candidate parameters with a more narrow range can be learned or determined, wherein in the simulated application, the subset of candidate parameters with a more narrow range, is already determined to be safe. Preferably, the information, if a certain range of candidate parameters is determined as safe, is based on the measured performance information.

In a preferred embodiment, reality data of the machine is acquired while executing the program in the real application, wherein the simulated application is modified based on the reality data.

Preferably, reality data is acquired using measurements from the real world and further estimations, in particular physics parameters like weights, friction, coefficients, etc. Based on the reality information, the simulated application can be modified, in order to decrease the reality gap, describing the difference between results of the simulated application compared to results of the real application, when the corresponding program is executed with the same candidate parameters.

In a preferred embodiment, the set of candidate parameters is assigned to the simulated application and/or the real application based on the candidate policy and the state by at least one manager. Preferably, the set of candidate parameters are requested by the simulated application and/or the real application. Preferably, the interim results of tested sets of candidate parameters are received based on a measured performance of the execution of the program by the manager.

The manager preferably triggers the execution of the application program. Further preferably, the manager collects or receives the performance information of the application and preferably provides the performance information to a trainer.

Preferably, the manger provides the simulated application and/or the real application with a set of candidate parameters based on the state, when the simulated application and/or the real application requests a set of candidate parameters. The state of the simulated application and/or the real robot application thereby is either provided by the simulated application and/or the real robot application or is provided by another source, different from the simulated application and/or the real application, e.g. a camera, a URL, a File System, and/or API endpoint. In the second case, the real application and/or the simulated application will only provide the information that it now needs the set of candidate parameters for the current state.

In an advantageous embodiment an individual application manager is associated to each application, simulated application or real application.

In a preferred embodiment, the interim results are received by a trainer, wherein the trainer triggers the generation of new policies by the learner.

The trainer preferably requests and receives the initial candidate policy and/or the new policies from the learner. Furthermore, the trainer preferably assigns the candidate policy to the manager. If there are several managers, the trainer assigns the candidate policy to individual managers. Additionally, the trainer preferably receives the performance information from the manger or managers and triggers the generation of new candidate policies by the learner. The trainer preferably receives the new candidate policy from the learner.

According to an aspect of the present disclosure, a system for applying machine learning, in particular state based machine learning, to an application comprises a learner, configured to generate learning policies, at least one simulated application, a program, configured to be executed in the simulated application based on a set of candidate parameters provided based on the candidate policy and a state of the simulated application. The program is configured to provide interim results of tested sets of candidate parameters based on a measured performance information of the execution of the program. The system further comprises a trainer, being configured to collect a predetermined number of interim results, wherein the trainer is configured to provide an end result based on a combination of the candidate parameters and/or the state with the measured performance information. The learner is configured to generate a new candidate policy based on the end result.

In a preferred embodiment, the system comprises at least one real application, wherein the program is configured to be executed in the simulated application and in the real application based on the set of candidate parameters. Preferably, the program is configured to be executed simultaneously in a plurality of simulated applications and in at least one real application.

In a preferred embodiment, the set of candidate parameters has a parameter range, wherein the set of candidate parameters executed on the simulated application has a wider parameter range than the set of candidate parameters executed on the real application.

In a preferred embodiment, the system comprises a sensor, configured to acquire reality data while the program is executed in the real application, wherein the simulated application is configured to be modified based on the reality data.

In a preferred embodiment, the system comprises a manager, configured to assign the set of candidate parameters to the simulated application and/or the real application based on the 1 candidate policy and the state. Preferably, the manager is configured to receive the interim results of tested sets of candidate parameters based on a measured performance of the execution of the program, wherein further preferably the learner is configured to receive the interim results by a trainer and the trainer is configured to trigger the generation of new policies by the learner.

Preferably, one or more of the real application, the simulated application, the learner, the manager and the trainer, are combined in a single software or hardware component. In particular, the learner and the manager, in particular the plurality of managers, are combined in a single software or hardware component.

According to an aspect of the present disclosure, a set of final parameters is obtained by the described method.

According to an aspect of the present disclosure, a program element is provided that when it is executed on a system for applying machine learning, in particular state based machine learning, to an application instructs the system to execute the following steps:
a) Generating a candidate policy by a learner;
b) Executing a program in at least one simulated application based on a set of candidate parameters provided based on the candidate policy and a state of the simulated application, the execution of the program providing interim results of tested sets of candidate parameters based on a measured performance information of the execution of the program;
c) Collecting a predetermined number of interim results and providing an end result based on a combination of the candidate parameters and/or the state with the measured performances information by a trainer; and
d) Generating a new candidate policy by the learner based on the end result.

According to an aspect of the present disclosure a computer-readable medium is provided, on which a described program element is stored.

The system 10 shown in FIG. 1 relates to a system 10 for applying machine learning to a real application, in particular a real robot application 71, for a machine, in particular a robot 70. The system 10 comprises a learner 20, a trainer 30, a first manager 41, a second manager 42, a third manager 43, a first simulated application 51, a second simulated application 52, a simulation model 60, a real robot application 71 and one or more robot programs 80.

The first simulated application 51 runs on a first virtual machine or computer device and the second simulated application 52 runs on a second virtual machine or computer device. The first simulated application 51 and the second simulated application 52 can also run on the same virtual machine and/or the same computer device. The first simulated application 51 runs on a first simulation 53 and the second simulated application 52 runs on a second simulation 54. The first simulation 53 and the second simulation 54 are based on a simulation model 60, which provides a platform for executing the robot program 80 in the first simulated application 51 and the second simulated application 52.

The real robot application 71 runs on a robot 70. The robot 70 is a real physical machine. The simulation model 60 is a digital reflection of the robot 70. In the ideal case, the robot program 80 executed on the first simulation 53 or the second simulation 54 lead to the same interim results as the robot program 80 executed on the robot 70. However, almost always, there is a difference between the simulation and the physical machine.

In this example, the robot program 80 can be expressed by the following pseudo code:
float r//search radius
float I//search increment
int p//search pattern
Pick (Pos_0)
Move (Pos_1)
Insert_object(r, i, p)

The robot program 80 contains instructions for picking up an object at position Pos_0, moving it to a position Pos_1 and inserting it into a pocket 94 or a similar in the proximity Pos_1. In this example, the insertion method has three parameters. A first parameter r is a radius around Pos_1, in which the robot will search for the pocket, wherein the radius is a search radius of the robot 70. A second parameter p is a search pattern. Parameter p for example determines if the search pattern is radial with rotation or radial without rotation. A third parameter i is the increment, which defines the granularity of the search.

In order to apply machine learning to the first simulated application 51, the second simulated application 52 and the real robot application 71, the learner 20 is configured to generate an initial candidate policy P. Additionally, the learner 20 is configured to generate a new candidate policy P. The candidate policy P is a mapping of states S1, S2, S3 to sets of candidate parameters PC1, PC2, PC3, comprising the first parameter r, the second parameter p and the second parameter i.

The learner 20 is connected to the trainer 30, which itself is connected to the first manager 41, the second manager 42 and the third manager 43. Although it is possible to only have a single manager, in this example one manager 41, 42, 43 is associated with one application 51, 52, 71, respectively. The first manager 41 is associated with the first simulated application 51, the second manager 42 is associated with the second simulated application 52 and the third manager is associated with the real robot application 71.

Generally spoken, the learner 20 provides the trainer 30 with a plurality candidate policies P. The trainer 30 provides the candidate policy/the candidate policies P to the first the first simulated application 51, the second simulated application 52 and the real robot application 71. After starting the respective program 80, the first simulated application 51 requests a first set of candidate parameters PC1 from the first manager 41 together with providing a first state S1 of the first simulated application 51. Accordingly, the second simulated application 52 requests a second set of candidate parameters PC2 from the second manager 42 together with providing a second state S2 of the second simulated application 52. Further accordingly, the real robot application 71 request a set of candidate parameters from the third manager 43 together with providing a third state S3 of the real robot application 71. The first state S1, the second state S2 and the third state S3 in this case describe which object 91, 92, 93 should be inserted into the pocket 94, for example a cubical object, a cylindrical object or similar.

The first manager 41 choses the relevant candidate policy P according to the provided first state S1 and provides the first simulated application 51 with a first set of candidate parameters PC1. The second manager 42 choses the relevant candidate policy P according to the provided second state S2 and provides the second simulated application 52 with a second set of candidate parameters PC2. The third manager 43 choses the relevant candidate policy P according to the provided third state S3 and provides the real robot application 71 with a third set of candidate parameters PC3.

The first simulated application 51 provides a first interim result R1, the second simulated application 52 provides a second interim result R2 and the real robot application 71 provides a third interim result R3 via the respective first manager 41, second manager 42 and third manager 43 to the trainer 30. The trainer 30 then provides the learner 20 with end results R, on which bases new policies P are generated, until the machine learning is completed and a set of final policy PF is found, which then is provided to the real robot application 71.

Figure 2:
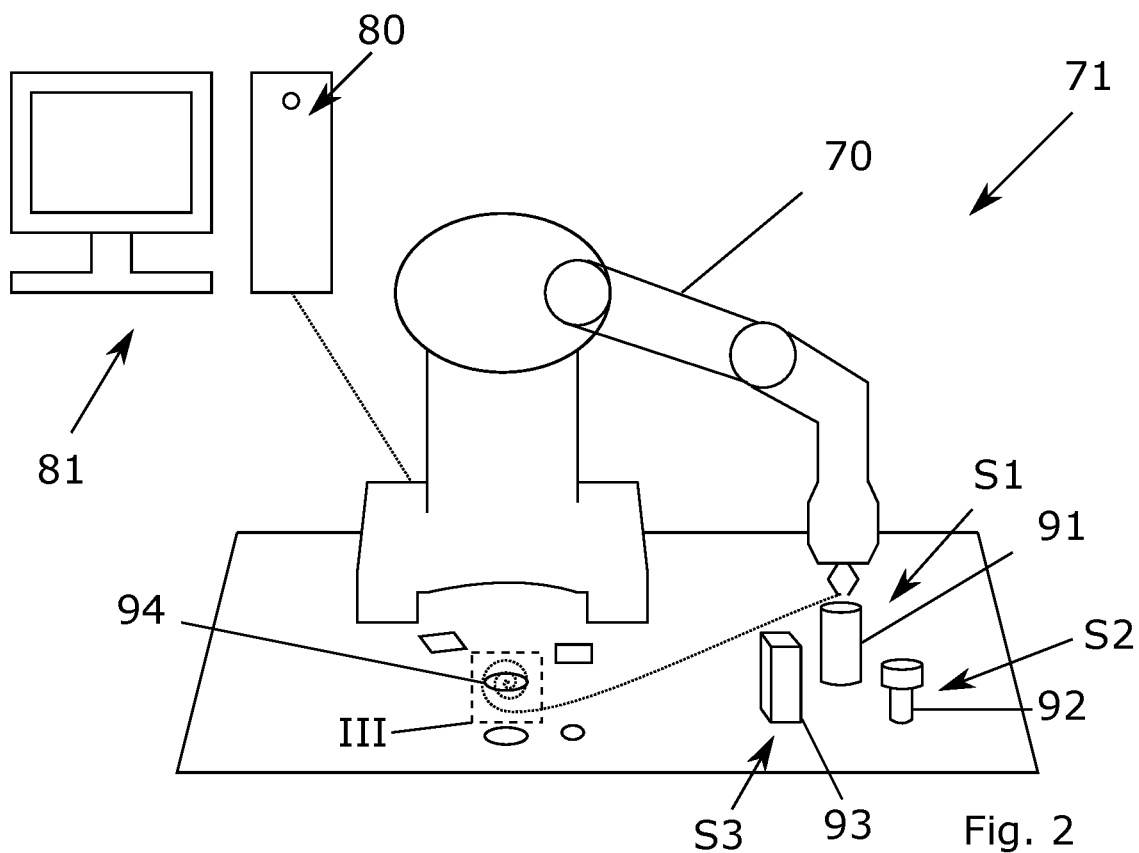
FIG. 2 shows a real robot application according to a first embodiment.
Figure 3:
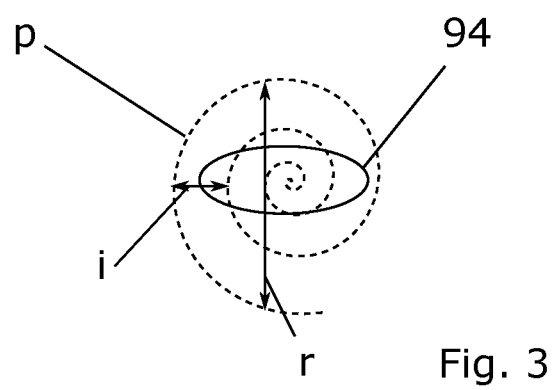
FIG. 3 shows a magnified view of the search pattern of FIG. 2.

FIG. 2 shows a real robot application 71 according to a first embodiment. A robot 70 is controlled by a computer device 81. On the computer device 81, the program 80 is executed. The robot program 80 is for example provided with the third set of candidate parameters PC3, including the first parameter r, the second parameter p and the third parameter i. As illustrated in FIG. 3, the first parameter r determines the radius of a region for a search motion of the robot 70. The second parameter p setting the search pattern is in this case set to a spiral search pattern. The third parameter i determines an increment for the search motion, in this case the spiral search motion.

As possible objects, there is a first object 91, a second object 92 and a third object 93 present, which all differ from each other. The state of the real robot application 71 is defines by the object to be inserted. Therefore, there are three possible states, relating to the objects to be inserted. When the first object 91 should be inserted, the state of the real robot application 71 is the first state S1. Accordingly, when the second object 92 should be inserted, the state of the real robot application 71 is the second state S2. Further accordingly, when the third object 93 should be inserted, the state of the real robot application 71 is the third state S3. In this case the third object 93 should be inserted, which leads to the third state S3.

The program simulates uncertainty with 100 random start positions for each set of candidate parameters.

As a learning algorithm, any kind of meta-heuristic for optimization like genetic algorithms, tabu-search or simulated annealing can be used to optimize the parameters.

In this example, the parameters are initialized with rough ranges of the first parameter r being in a range of 3.0 mm and 20.0 mm and the third parameter i being in a range of 0.1 mm and 5.0 mm. In this example, the second parameter p is a stable spiral pattern.

The real robot application 71 returns the third interim result R3, in this case, the time required to finish the search.

Figure 4:
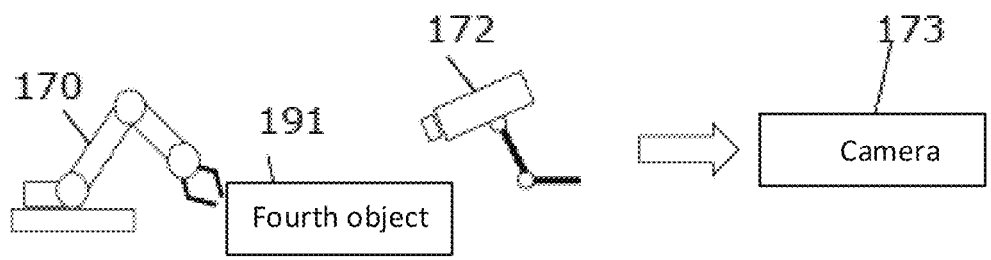
FIG. 4 shows a real robot application according to a second embodiment.

FIG. 4 shows a real robot application 171 according to a second embodiment.

The real robot application 171 comprises a robot 170, picking up a fourth object 191.

A camera 173 makes pictures of the fourth object 191 in front of the robot 170 for determining the state of the real robot application 171. The camera 173 produces a black-and-white bitmap 174, in particular of dimension 250×250. In contrast to the real robot application 71 in accordance to the first embodiment, here the set of candidate parameters PC that should be learned for the program 80 is the two points, the robot gripper 172 should make contact to the fourth object 191, when picking it up. In this example, a state of the real robot application 171 also relates to the type of object to be picked up. Preferably, the gripping points are defined in 3D space [R×R×R] and optimal mapping is learned from the space of all black-white bitmaps ($\{0,1\}^{250 \times 250}$) into the parameter space [R×R×R]×[R×R×R].

Figure 5:
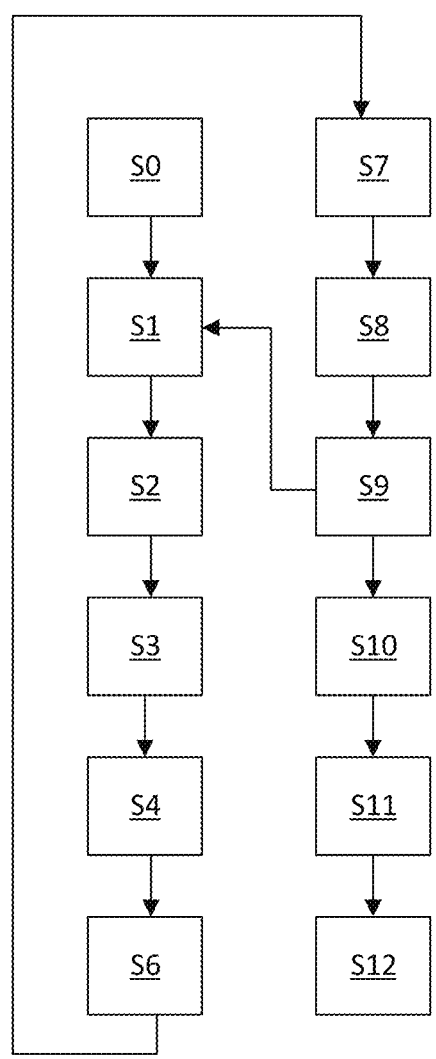
FIG. 5 shows a method for applying machine learning to an application.

The method for applying state based machine learning to an application is illustrated in FIG. 5, wherein in the exemplary embodiment the real application is a real robot application 71 and the machine executing the real robot application 71 is a robot 70.

In step S0, the learner 20 generates one or more initial candidate policies P. A policy is a mapping of states to candidate parameters PC.

In step S1, the learner 20 makes one or more policies P available to the trainer 30.

In step S2, the trainer 30 distributes the one or more policies P to the manager, in this case the first manager 41, the second manager 42 and the third manager 43.

In step S3, the respective first manager 41, second manager 42 and third manager 43 sets a first set of candidate parameters PC1, a second set of candidate parameters PC2 and/or a third set of candidate parameters PC3 of the robot program 80 based on the policy P in the first simulated application 51, the second simulated application 52 and/or the real robot application 71, respectively.

In step S4, the first simulated application 51, the second simulated application 52 and/or the real robot application 71 are run.

In step S5, the robot program 80, at a certain position in the program, requires a parameter. The first simulated application 51 requests a first set of candidate parameters PC1 while providing a first state S1. The second simulated application 52 requests a second set of candidate parameters PC2 while providing a second state S2. The real robot application 71 requests a third set of candidate parameters PC3 while providing a third state S3. The first state S1, the second state S2 and/or the third state S3 relate to the type of object being inserted.

In step S6, the first manager 41 provides the first set of candidate parameters PC1 from the candidate policy P based on the first state S1. The second manager 42 provides the second set of candidate parameters PC2 from the candidate policy P based on the second state S2. The third manager 43 provides the third set of candidate parameters PC3 from the candidate policy P based on the third state S3.

In step S7, the first simulated application 51, the second simulated application and/or the real robot application 71 continues the execution of the robot program 80 and each provides information about the performance, preferably with candidate parameter values and corresponding state, in form of the first interim result R1, the second interim result R2 and/or the third interim result R3, respectively.

In step S8, the first manager 41, the second manager 42 and/or the third manager 43 makes the first interim result R1, the second interim result R2 and/or the third interim result R3 available to the trainer 30.

In step S9, the steps S4 to S7 are executed repeatedly. In an alternative embodiment, the managers 41, 42, 43 might collect interim results R1, R2, R3 before making them available to the trainer 30. Alternatively, if potential states S1, S2, S3 are known a priori, multiple sets of candidate parameters PC may also be provided at once and the corresponding application 51, 52, 71 execution takes the corresponding set of candidate parameters PC according to the state S1, S2, S3. In both cases, the learner 20 uses the end results R relating to the states S1, S2, S3 to improve the policies P.

In step S10, The trainer 30 makes the end results R available to the learner 20. The trainer as well might collect interim results R1, R2, R3 from the managers 41, 42, 43 before sharing them with the learner 20. Alternatively, a database might be used to store the end results R and the learner 20 reads from there.

In step S11, the learner 20 generates a new policy P based on the end result R.

After step 9, the process continues repeatedly from step 1 until a stop criterion, like a number of tested configurations or a convergence in a stable solution, is met. After meeting this stop criterion, the best learned solution is set as final solution in the robot program 80 by providing the robot program 80 with a final policy PF in step 12.

After this step 12, the learning infrastructure is not required for robot operation anymore.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10 system
20 learner
30 trainer
41 first manager
42 second manager
43 third manager
51 first simulated application
52 second simulated application
53 first simulation
54 second simulation
60 simulation model
70 machine (robot)
71 real application (real robot application)
80 program (robot program)
81 computer device
91 first object
92 second object
93 third object
94 pocket
170 machine (robot)
171 real application (real robot application)
172 robot gripper
173 camera
174 bitmap
191 fourth object
PC set of candidate parameters
PC1 first set of candidate parameters
PC2 second set of candidate parameters
PC3 third set of candidate parameters
R end result
R1 first interim result
R2 second interim result
R3 third interim result
P candidate policy
PF final policy

What is claimed is:

1. A method for applying machine learning to an application, comprising:
   a) generating a candidate policy by a learner, wherein the candidate policy describes a mapping of states to a set of candidate parameters;
   b) assigning the set of candidate parameters to at least one simulated application based on the candidate policy and the states by at least one manager;
   c) executing a program in the at least one simulated application based on a set of candidate parameters provided based on the candidate policy and a state of the at least one simulated application,
   execution of the program providing interim results of tested sets of candidate parameters based on a measured performance information of the execution of the program,
   wherein the set of candidate parameters are requested by the at least one simulated application together with providing the state of the at least one simulated application, wherein the program is executed simultaneously in the at least one simulated application and in at least one real application comprising a real robot application, wherein reality data of the machine is acquired while executing the program in the at least one real application, and
   wherein the at least one simulated application is modified based on the reality data, wherein the reality data is acquired using a sensor placed in a real-world environment;
   d) collecting a predetermined number of interim results and providing an end result based on a combination of the candidate parameters and the states with the measured performances information by a trainer; and
   e) generating a new candidate policy by the learner based on the end result using machine learning algorithms.

2. The method of claim 1, wherein the program is executed in cooperating real applications.

3. The method of claim 2, wherein the candidate policy defines task assignments to each of the cooperating real applications.

4. The method of claim 1, wherein a) to d) are repeated until a stop criterion is met.

5. The method of claim 4, wherein the stop criterion comprises an amount of executions of the program and a target measured performance.

6. The method of claim 1, wherein the set of candidate parameters has a parameter range, and wherein the set of candidate parameters executed on the at least one simulated application has a wider parameter range than the set of candidate parameters executed on the at least one real application.

7. The method of claim 1, further comprising: assigning the set of candidate parameters to the at least one simulated application and the at least one real application based on the candidate policy and the states by at least one manager.

8. The method of claim 7, further comprising: requesting the set of candidate parameters by the at least one simulated application and the at least one real application; and receiving the interim results of tested sets of candidate parameters based on a measured performance of the execution of the program by the manager.

9. The method of claim 1, further comprising: receiving the predetermined number of interim results by a trainer, wherein the trainer triggers generation of new policies by the learner.

10. The method of claim 1, further comprising obtaining a set of final parameters.

11. A system for applying machine learning to an application, comprising:
a learner configured to generate learning policies, wherein the candidate policy describes a mapping of states to a set of candidate parameters;
at least one real application;
at least one simulated application;
a manager, configured to assign the set of candidate parameters to the at least one simulated application based on the candidate policy and the states;
a program configured to be executed, by a processor, in the at least one simulated application based on a set of candidate parameters provided based on the candidate policy and a state of the at least one simulated application,
the program being configured to provide interim results of tested sets of candidate parameters based on a measured performance information of the execution of the program,
wherein the set of candidate parameters are requested by the at least one simulated application together with providing the state of the at least one simulated application, wherein the program is configured to be executed simultaneously in the at least one simulated application and in the at least one real application based on the set of candidate parameters, wherein the at least one real application comprising a real robot application;
a trainer configured to collect a predetermined number of interim results, the trainer being configured to provide an end result based on a combination of the candidate parameters and the states with the measured performance information, wherein the learner is configured to generate a new candidate policy based on the end result using machine learning algorithms; and
a sensor configured to acquire reality data while the program is executed in the at least one real application, wherein the sensor is placed in a real-world environment, and wherein the at least one simulated application is configured to be modified based on the reality data.

12. The system of claim 11, wherein the set of candidate parameters has a parameter range, and
wherein the set of candidate parameters executed on the at least one simulated application has a wider parameter range than the set of candidate parameters executed on the at least one real application.

13. The system of claim 11, further comprising:
a manager configured to assign the set of candidate parameters to the at least one simulated application and the at least one real application based on the candidate policy and the states.

14. A tangible, non-transitory computer readable medium for applying machine learning to an application, the computer readable medium having instructions thereon, which, upon being executed by the one or more processors, provides for execution of the following steps:
a) generating a candidate policy, by a learner, wherein the candidate policy describes a mapping of states to a set of candidate parameters;
b) assigning the set of candidate parameters to at least one simulated application based on the candidate policy and the states by at least one manager;
c) executing a program in the at least one simulated application based on a set of candidate parameters provided based on the candidate policy and a state of the at least one simulated application,
the execution of the program providing interim results of tested sets of candidate parameters based on a measured performance information of the execution of the program,
wherein the set of candidate parameters are requested by the at least one simulated application together with providing the state of the at least one simulated application,
wherein the program is executed simultaneously in the at least one simulated application and in at least one real robot application,
wherein reality data of the machine is acquired while executing the program in the at least one real application, and
wherein the at least one simulated application is modified based on the reality data, wherein the reality data is acquired using a sensor placed in a real-world environment;
d) collecting a predetermined number of interim results and providing an end result based on a combination of the candidate parameters and the states with the measured performances information by a trainer; and
e) generating a new candidate policy by the learner based on the end result using machine learning algorithms.

* * * * *